July 11, 1933.  W. H. D. SPEARS  1,917,816
VALVE
Filed March 31, 1931

INVENTOR.
William H. D. Spears
BY
Harry C. Schroeder
ATTORNEYS.

Patented July 11, 1933

1,917,816

UNITED STATES PATENT OFFICE

WILLIAM H. D. SPEARS, OF WALNUT CREEK, CALIFORNIA

VALVE

Application filed March 31, 1931. Serial No. 526,660.

This invention is a valve and has special reference to intake and exhaust valves for internal combustion engines.

The main object of the invention is to provide a self adjusting valve for gasoline engines, one which will automatically take up any wear in the valve or valve seat.

Another object of the invention is to provide a valve with which a valve opening of great area can be provided with minimum valve movement thus increasing the efficiency and speed of the engine.

A further object of the invention is to provide a valve which will require no extra room or increased volume in the combustion chamber to permit its operation.

Other objects and advantages of the invention will become apparent as the following description is read on the drawing forming a part of this specification and in which similar reference characters are used to designate similar parts throughout the several views, of which Fig. 1 is a longitudinal sectional elevation through a cylinder block and head with my invention applied thereto;

Figure 1:
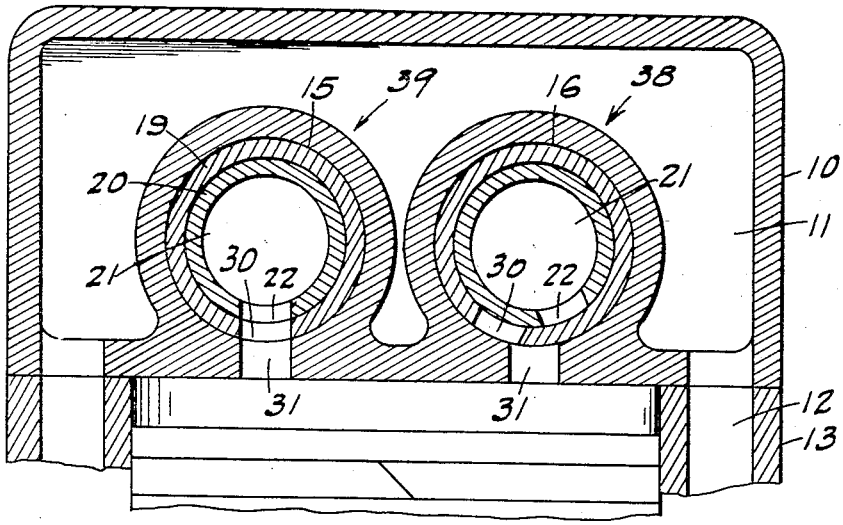
Figure 2:
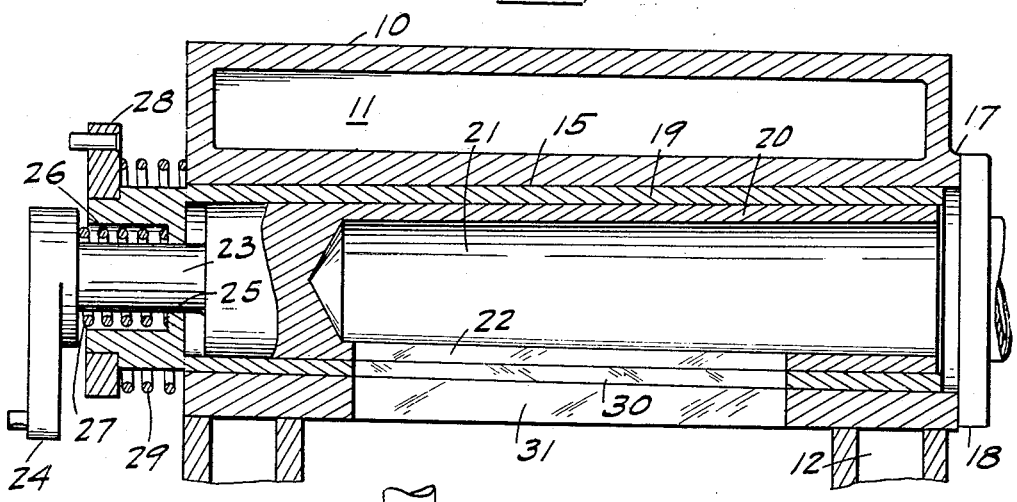
Fig. 2 is a transverse sectional elevation through a cylinder and cylinder head, the valve being indicated in section.

The invention consists of a cylinder head 10 provided with water jackets 11 communicating with water jackets 12 in the usual cylinder blocks 13, the cylinder head being bolted to the cylinder block in the usual manner. Spark plugs are to be mounted in the usual manner and may extend through the cylinder wall into the combustion chamber or may be mounted in the head.

Two taper bores 15 and 16 are formed transversely through the cylinder head, one for the exhaust valve and one for the intake valve. A pad 17 is adapted to cooperate with the flange of a manifold 18, two manifolds being required for cooperation respectively with the intake and exhaust valves.

The valve consists of two tapered cylindrical members 19 and 20, the member 19 being rotatable within the bore 15 or 16 and the member 20 being rotatable within the member 19. Member 20 has an axial bore 21 extending part way therethrough and a longitudinal slot 22 formed through the wall thereof, communicating with the bore 21, the member terminating in a tang 23 to which is secured a lever 24 or other operating means such as a pinion.

Member 19 consists of a tapered sleeve with a hub having a bore 25 to receive the tang 23 and a counterbore 26 for a compression spring 27 which urges the member 20 into the tapered bore or sleeve 19. A lever 28 is fixed to the hub as indicated, or a pinion may be used for operation of the device, and a compression spring 29 cooperates between lever 28 and the cylinder head for urging the sleeve 19 into the tapered bore 15. A longitudinal slot 30 is adapted to register with the slot 22 and with a slot 31 formed in the cylinder head lower wall and communicating with the combustion chamber.

Figure 3:
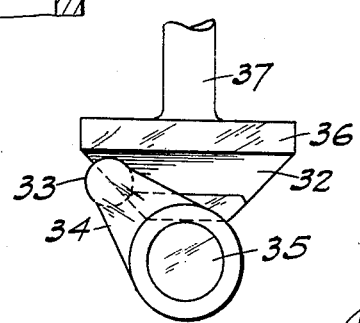
Fig. 3 is a valve actuating mechanism adapted to my invention.

Positive operation of the valve may be obtained in various ways, and one method is indicated in Fig. 3, in which a cam slot 32 cooperates with a pin 33 or roller on a lever 34 fixed to the cam shaft 35, the cam slot 32 being formed in a shoe 36 on the valve rod 37, and cooperating with the roller 33 through substantially ninety degrees of movement of the shaft 35 which rotates at half crank-shaft speed.

It will be noted that the valve may be constructed with the plug 20 fitting directly in the taper bore 15 eliminating the sleeve 19 under which conditions the spring 27 would be seated against the cylinder head 10.

The operation of the device is as follows: The camshaft 35, rotating at half crank-shaft speed, raises and lowers the rod 37 in one quarter revolution of the camshaft, approximately. This movement rocks the members 19 and 20 from the position shown in Fig. 1 at the right to that shown at the left, and back to that shown at the right thereby opening and closing the port 31 during one quarter revolution of the camshaft, and, as the cam-shaft 35 turns through the remaining three quarters revolution, the port 31 is closed.

Considering the intake valve at 38 and exhaust valve at 39, the intake valve 38 would open and close through the first quarter revolution of the camshaft and the exhaust valve would open and close through the last quarter revolution thereof. A double connection is made from the valve rod 37 respectively to levers 24 and 28.

Having described an operable method of constructing and using the invention, it will be understood that variations in construction and arrangement of parts which are consistent with the appended claims may be resorted to without detracting from the spirit or scope of the invention or sacrificing any of the advantages thereof.

I claim:—

1. Securing means for tapered telescoping valves comprising a spring cooperating between a cylinder block and the outer valve member to urge the outer valve member into a tapered bore formed in the cylinder block and a second spring cooperating between the outer and inner valve members for urging the inner valve member into a tapered bore formed in the outer valve member.

2. Securing means for a tapered telescoping valve consisting of an outer tapered valve member having a tapered bore and mounted in a tapered bore formed in a cylinder head member, and an inner tapered valve member mounted in the tapered bore in said outer valve member; said securing means comprising resilient means cooperating between the cylinder head and the outer valve member and another spring cooperating between the outer valve member and the inner valve member whereby said valve members are independently urged in the respective bores to compensate for wear between the members.

3. A valve comprising in combination with a cylinder head having a tapered bore; outer and inner tapered telescopic valve members, a lever secured on one end of the outer valve member, a spring cooperating between the lever and the cylinder head, a shaft extension on the inner valve member and extending through said one end of the outer valve member, a lever secured on said shaft extension and a spring cooperating between said lever and the outer valve member, the outer valve member being urged into the tapered bore in the cylinder head and the inner valve member being urged into the tapered bore in the outer valve member by the springs, whereby the individual valve members are automatically adjusted to compensate for wear of the respective members.

In testimony whereof I have affixed my signature.

WILLIAM H. D. SPEARS.